US012021853B2

(12) United States Patent
Raffay et al.

(10) Patent No.: US 12,021,853 B2
(45) Date of Patent: Jun. 25, 2024

(54) TECHNIQUES FOR PROVIDING AUTHENTICITY GRAPHICAL USER INTERFACE DISPLAY AREAS VIA UNIQUE ASSET TOKEN WEBPAGES

(71) Applicant: Concept Source, Inc., Plainview, NY (US)

(72) Inventors: Charles Raffay, Jensen Beach, FL (US); Robert Fallas, Huntington, NY (US)

(73) Assignee: Concept Source, Inc., Plainview, NY (US)

( * ) Notice: Subject to any disclaimer, the term of this patent is extended or adjusted under 35 U.S.C. 154(b) by 208 days.

(21) Appl. No.: 17/658,522

(22) Filed: Apr. 8, 2022

(65) Prior Publication Data
US 2023/0262038 A1 Aug. 17, 2023

Related U.S. Application Data

(63) Continuation-in-part of application No. 17/651,125, filed on Feb. 15, 2022, now Pat. No. 11,822,944.

(51) Int. Cl.
*H04L 9/40* (2022.01)
*G06K 19/06* (2006.01)

(52) U.S. Cl.
CPC ........ *H04L 63/08* (2013.01); *G06K 19/06028* (2013.01); *G06K 19/06037* (2013.01)

(58) Field of Classification Search
CPC .............. H04L 63/08; G06K 19/06028; G06K 19/06037
See application file for complete search history.

(56) References Cited

U.S. PATENT DOCUMENTS 6,763,377 B1 *  7/2004  Belknap ................ H04L 69/329
                                                        709/224
8,074,248 B2 * 12/2011  Sigmon, Jr. ........ H04N 7/17318
                                                        725/110
(Continued)

FOREIGN PATENT DOCUMENTS

AU    2021902227        8/2021
WO    2019139678 A1     7/2019
(Continued)

OTHER PUBLICATIONS

Soroush Sedaghat, "Web Authenticity" (Year: 2002).*
(Continued)

*Primary Examiner* — Phillip H Nguyen
(74) *Attorney, Agent, or Firm* — M&B IP Analysts, LLC

(57) ABSTRACT

Techniques for providing authenticity display areas via webpage unique asset tokens (UATs). A method incudes encoding a webpage corresponding to a UAT into portions of code which cause projection of media content corresponding to the unique asset and projection of a graphical user interface display area populated with authenticity data of the UAT when executed. The UAT is associated with a unique asset. The method also includes creating a database including nodes. The nodes include webpage nodes and UAT nodes, where the encoded portions of code of the webpage and the authenticity data of the UAT are stored among the nodes. One of the webpage nodes is associated with the webpage and is connected to a UAT node of the UAT. The method also includes providing the at least one portion of code to a device authorized by an owner of the at least one first UAT node.

19 Claims, 7 Drawing Sheets

(56) References Cited

U.S. PATENT DOCUMENTS

| | | | |
|---|---|---|---|
| 9,292,682 B2* | 3/2016 | Grube | G06F 16/182 |
| 9,578,085 B2 | 2/2017 | Smith et al. | |
| 9,904,923 B2 | 2/2018 | Mattsson et al. | |
| 10,043,174 B1 | 8/2018 | Chikkanna | |
| 10,262,128 B2 | 4/2019 | Bomar et al. | |
| 10,600,009 B1 | 3/2020 | Augustine et al. | |
| 11,075,891 B1 | 7/2021 | Long et al. | |
| 11,102,255 B2 | 8/2021 | Davis et al. | |
| 2002/0083095 A1 | 6/2002 | Wu et al. | |
| 2007/0245353 A1 | 10/2007 | Ben-Dor | |
| 2011/0161400 A1* | 6/2011 | Silyaev | H04N 21/4622 709/203 |
| 2013/0125247 A1* | 5/2013 | Sprague | H04L 63/0428 726/28 |
| 2017/0012980 A1* | 1/2017 | Sanso | H04L 63/10 |
| 2019/0287175 A1 | 9/2019 | Hill et al. | |
| 2019/0303892 A1 | 10/2019 | Yantis et al. | |
| 2019/0392511 A1 | 12/2019 | Mahajan et al. | |
| 2020/0034869 A1 | 1/2020 | Harrison | |
| 2020/0111068 A1 | 4/2020 | Scarselli | |
| 2020/0160289 A1 | 5/2020 | Mahajan et al. | |
| 2020/0184041 A1 | 6/2020 | Andon et al. | |
| 2020/0184547 A1 | 6/2020 | Andon et al. | |
| 2020/0242105 A1 | 7/2020 | Rich et al. | |
| 2020/0272713 A1 | 8/2020 | Black | |
| 2020/0273048 A1 | 8/2020 | Andon et al. | |
| 2020/0394705 A1 | 12/2020 | Daie et al. | |
| 2021/0049234 A1* | 2/2021 | Kumar | G06F 40/117 |
| 2021/0174432 A1 | 6/2021 | Gonnaud et al. | |
| 2021/0248594 A1 | 8/2021 | Yantis et al. | |
| 2021/0256070 A1 | 8/2021 | Tran et al. | |
| 2021/0295324 A1 | 9/2021 | Kerseboom et al. | |
| 2021/0304197 A1 | 9/2021 | Pomassl et al. | |
| 2021/0342909 A1 | 11/2021 | Ketchel, III | |
| 2022/0006996 A1 | 1/2022 | Boissonade et al. | |
| 2023/0092012 A1* | 3/2023 | Matthews | G06Q 20/0658 |

FOREIGN PATENT DOCUMENTS

| | | | |
|---|---|---|---|
| WO | 2020118297 A1 | 6/2020 | |
| WO | 2020214880 A1 | 10/2020 | |

OTHER PUBLICATIONS

Haekal et al., "Token-Based Authentication Using JSON Web Token on SIKASIR RESTful Web Service" (Year: 2016).*

Markus Moilanen, "Developing a Web Service Databases, Security and Access Control" (Year: 2019).*

Chen et al., "Anomaly Behavior Analysis for Web Page Inspection" (Year: 2009).*

Chang et al., "Automatic information extraction from semi-structured Web pages by pattern discovery" (Year: 2003).

Karandikar et al., "Blockchain Based Transaction System with Fungible and Non-Fungible Tokens for a Community-Based Energy Infrastructure" (Year: 2021).

Liang et al., "The Scheme of Detecting Encoded Malicious Web Pages Based on Information Entropy" (Year: 2016).

Wang et al., "Non-Fungible Token (NFT): Overview, Evaluation, Opportunities and Challenges" (Year: 2015).

Wen et al., "Detecting Malicious Websites in Depth through Analyzing Topics and Web-pages" (Year: 2018).

* cited by examiner

TECHNIQUES FOR PROVIDING AUTHENTICITY GRAPHICAL USER INTERFACE DISPLAY AREAS VIA UNIQUE ASSET TOKEN WEBPAGES

CROSS-REFERENCE TO RELATED APPLICATIONS

This application is a continuation-in-part of U.S. patent application Ser. No. 17/651,125 filed on Feb. 15, 2022, the contents of which are hereby incorporated by reference.

TECHNICAL FIELD

The present disclosure relates generally to establishing authenticity of unique asset tokens such as non-fungible tokens (NFTs), and more specifically to providing graphical user interface components demonstrating such authenticity via webpage unique asset tokens.

BACKGROUND

A non-fungible token (NFT) is a non-interchangeable unit of data associated with an asset such as a physical or digital item. Because NFTs are unique, they can be utilized to provide data scarcity even for data that is easily replicated. Thus, owning a UAT can provide the ability to own data uniquely (i.e., such that only a single person or entity owns that data) or semi-uniquely (such as when a limited group of people each own a copy of the data). NFTs typically cannot be copied or transferred without permission, and can serve as a proof of authenticity as well as a means for accessing the owned assets.

Existing solutions for providing NFTs record transactions involving transfers of NFTs to a blockchain. A blockchain is a distributed digital ledger storing transaction data, where the distributed ledger is stored on multiple nodes such that each node is a computer storing a copy of the blockchain. Because copies of the blockchain are stored across multiple nodes, records cannot be altered on one node in order to falsify the records among the nodes. When new transaction data is to be added to the blockchain, the nodes validate the new transaction data and reach consensus regarding what data should be included in the updated blockchain. When such consensus occurs, transaction data is recorded on the blockchain on each node.

Although data stored on the blockchain can be retrieved in order to demonstrate the history of transactions involving a NFT, this information is often inadequate. In particular, due to the anonymous nature of many blockchain transactions, the true source of any given NFT may be obscured in the blockchain records. This effectively allows any entity, regardless of whether they are the originator of the underlying assets represented, to mint and sell NFTs of those assets, thereby permitting counterfeiting of NFTs for those assets. Moreover, due to the irreversible nature of transactions on blockchains, it can be difficult or impossible to undo such counterfeit NFTs. As a result, opportunities for misusing existing blockchain and NFT solutions present a significant challenge.

These counterfeiting problems may further pose challenges in adopting NFTs for purposes other than simply owning digital assets. For example, in order to implement as tickets to events (such as a ticket to a football game), it is critical to verify the authenticity of the NFT. Moreover, to be practical for such uses, techniques for quickly yet accurately verifying the authenticity of NFTs used as tickets are needed.

Given the above challenges and many more, new solutions for demonstrating authenticity of NFTs are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing authenticity display areas via webpage unique asset tokens. The method comprises: encoding a webpage corresponding to a unique asset token (UAT) into a plurality of portions of code including at least one first portion of code and at least one second portion of code, wherein the UAT is associated with at least one unique asset, wherein the at least one first portion of code causes projection of media content corresponding to the at least one unique asset when executed, wherein the at least one second portion of code causes projection of a graphical user interface display area populated with authenticity data of the UAT when executed; creating a database including a plurality of nodes, the plurality of nodes including a plurality of webpage nodes and a plurality of UAT nodes, wherein the encoded portions of code of the webpage and at least a portion of the authenticity data of the UAT are stored among a portion of the plurality of nodes, wherein a first webpage node of the plurality of webpage nodes is associated with the webpage, wherein a first UAT node of the plurality of UAT nodes is connected to the first webpage node, wherein the first UAT node corresponds to the UAT; and providing the at least one portion of code to a device authorized by an owner of the at least one first UAT node.

Certain embodiments disclosed herein also include a non-transitory computer readable medium having stored thereon causing a processing circuitry to execute a process, the process comprising: encoding a webpage corresponding to a unique asset token (UAT) into a plurality of portions of code including at least one first portion of code and at least one second portion of code, wherein the UAT is associated with at least one unique asset, wherein the at least one first portion of code causes projection of media content corresponding to the at least one unique asset when executed, wherein the at least one second portion of code causes projection of a graphical user interface display area populated with authenticity data of the UAT when executed; creating a database including a plurality of nodes, the plurality of nodes including a plurality of webpage nodes and a plurality of UAT nodes, wherein the encoded portions of code of the webpage and at least a portion of the authenticity data of the UAT are stored among a portion of the plurality of nodes, wherein a first webpage node of the plurality of webpage nodes is associated with the webpage, wherein a first UAT node of the plurality of UAT nodes is connected to the first webpage node, wherein the first UAT node corresponds to the UAT; and providing the at least one portion of code to a device authorized by an owner of the at least one first UAT node.

Certain embodiments disclosed herein also include a system for providing authenticity display areas via webpage unique asset tokens. The system comprises: a processing circuitry; and a memory, the memory containing instructions that, when executed by the processing circuitry, configure the system to: encode a webpage corresponding to a unique asset token (UAT) into a plurality of portions of code including at least one first portion of code and at least one second portion of code, wherein the UAT is associated with at least one unique asset, wherein the at least one first portion of code causes projection of media content corresponding to the at least one unique asset when executed, wherein the at least one second portion of code causes projection of a graphical user interface display area populated with authenticity data of the UAT when executed; create a database including a plurality of nodes, the plurality of nodes including a plurality of webpage nodes and a plurality of UAT nodes, wherein the encoded portions of code of the webpage and at least a portion of the authenticity data of the UAT are stored among a portion of the plurality of nodes, wherein a first webpage node of the plurality of webpage nodes is associated with the webpage, wherein a first UAT node of the plurality of UAT nodes is connected to the first webpage node, wherein the first UAT node corresponds to the UAT; and provide the at least one portion of code to a device authorized by an owner of the at least one first UAT node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
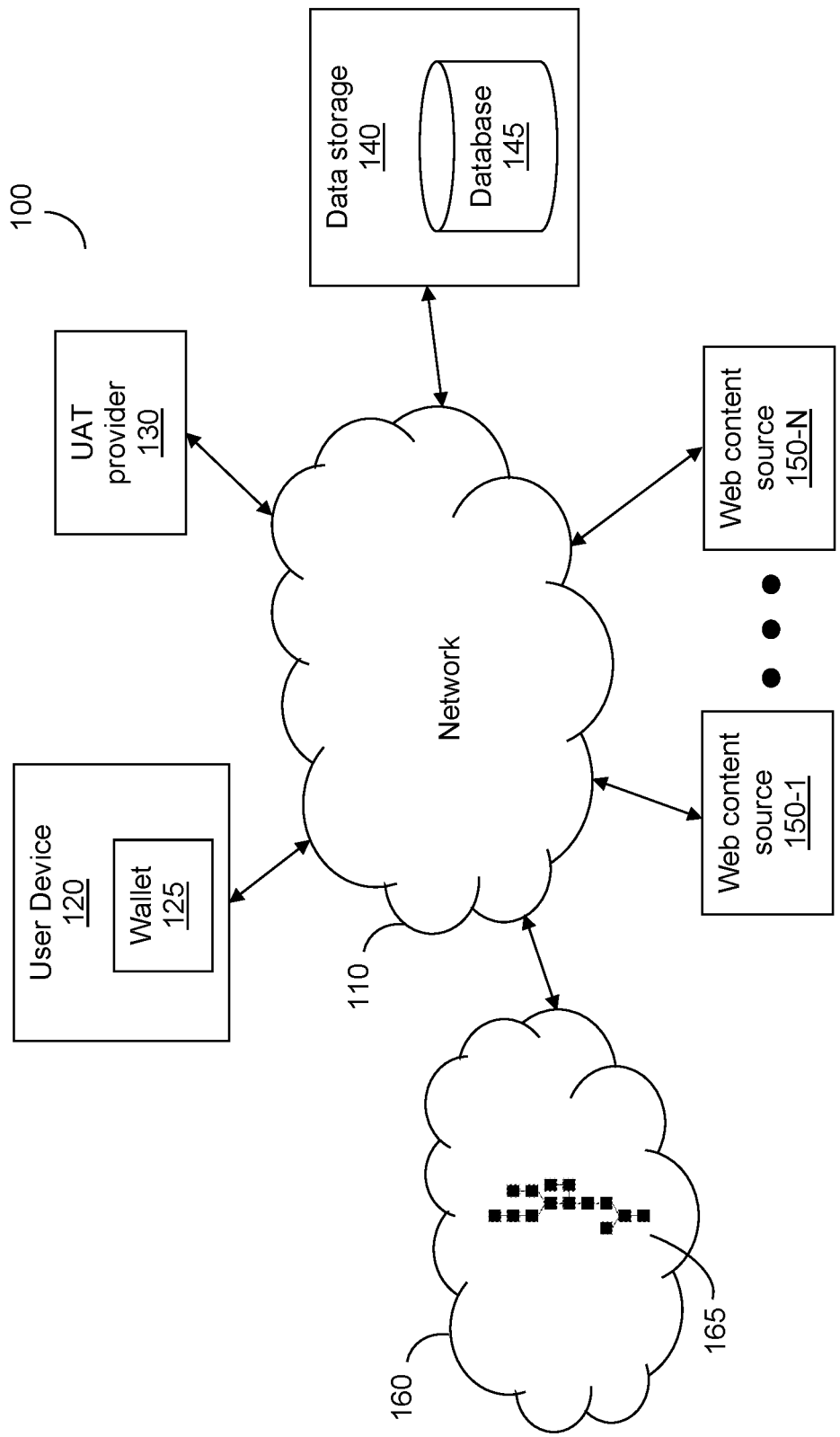
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for providing authenticity graphical user interface (GUI) display areas via webpage unique asset tokens (UATs), thereby allowing for establishing authenticity of those UATs. In accordance with various disclosed embodiments, authenticity GUI display areas such as windows or other views populated with authenticity-related data are provided in response to interactions via webpages representing UATs.

In an embodiment, a request to mint a UAT is received. A webpage for the UAT is created or identified and encoded into portions of code. A database is created or updated such that the database includes one or more webpage nodes representing the webpage and one or more UAT nodes representing UATs that indicate ownership of a respective asset whose functionality is provided via the webpage. The asset for each UAT may be a digital asset (i.e., such that the UAT functions as a non-fungible token) or physical asset. The portions of the encoded webpage are distributed among nodes in the database. Once encoded, the portions of code of the webpage include code for displaying media content of the webpage as well as for projecting a display area populated with authenticity data related to the UAT corresponding to the webpage.

Once the database including the webpage nodes and the UAT nodes is created or updated, the database may optionally be stored on a decentralized ledger such as a blockchain. Further, at any point after the database is created or updated, the UAT nodes may be transferred (thereby transferring the UATs represented by the UAT nodes) by altering connections between nodes in the database, thereby further updating the database and effectively allowing for transferring ownership of applications.

When a user associated with a given UAT node (e.g., a user of a wallet represented by a wallet node connected to the UAT node in the database) desires to verify the authenticity of the corresponding UAT (i.e., the app of the webpage node connected to the UAT node in the database), the user may first request to access the UAT node, for example by navigating to a uniform resource locator (URL) of the corresponding webpage UAT. This request may require some form of authentication, for example, via a wallet device or application associated with the UAT node. The requested web content is provided to a device authorized by the user such as, but not limited to, a user device operated by the user. Specifically, the respective portions of code of the web content to be accessed are provided.

In accordance with various disclosed embodiments, the web content provided when the user navigates to the webpage associated with the UAT node includes interactable icons or other user interface elements. The portions of the code for the webpage include code for rendering a GUI display area populated with authenticity data for the UAT that is retrieved from the database when a user interacts with the interactable elements. Such authenticity data may include, but is not limited to, an originator of the UAT, marketplace(s) on which the UAT is listed, transaction history of the UAT, combinations thereof, and the like. The GUI display area populated with the authenticity data may be, but is not limited to, a window or portion thereof. Thus, the disclosed embodiments allow for delivering such GUI display areas via the webpage UATs.

In this regard, the webpage representing the UAT provided in accordance with various disclosed embodiments can serve as an authentication token demonstrating a certificate of authenticity for the corresponding UAT. More specifically, showing the GUI display area including the relevant authenticity information may demonstrate the authenticity of the underlying UAT to a person or system viewing the GUI display area. The authenticity information may further illustrate relevant information about the source of the UAT or otherwise about the origin of the UAT.

In some embodiments, the GUI display area may include a machine-readable optical label such as a QR code or other barcode. The machine-readable optical label includes information which can be used to verify the authenticity of the UAT, where this information may be displayed on a device of the verifying entity when the device scans the machine-readable optical label (e.g., via a camera of the device). To this end, the information may include, but is not limited to, the authenticity data, the web content of the webpage corresponding to the UAT, a link to an external authenticity webpage, a link to one or more marketplaces on which the UAT is listed, a combination thereof, and the like.

In a further embodiment, the machine-readable optical label may be generated, for example when the authenticity is requested. When generated this way, the machine-readable optical label may be embedded with a timestamp indicating a date, a time, or both, at which the label was generated. When the webpage identified in the label is visited, the device displaying the webpage may further display the date and/or time of the timestamp. This may allow, for example, a person viewing the authenticity webpage to confirm that the authenticity has been recently verified (e.g., within the past hour, day, week, etc.). In this regard, it is noted that authenticity webpages may be considered stale or otherwise expired after a certain period of time passes since the webpage was generated.

FIG. 1 shows an example network diagram 100 utilized to describe the various disclosed embodiments. In the example network diagram 100, a user device 120, a unique asset token (UAT) provider 130, a data storage 140, a plurality of web content sources 150-1 through 150-N (hereinafter referred to individually as an web content source 150 and collectively as web content sources 150, merely for simplicity purposes), and a blockchain network 160 communicate via a network 110.

The network 110 may be, but is not limited to, a wireless, cellular or wired network, a local area network (LAN), a wide area network (WAN), a metro area network (MAN), the Internet, the worldwide web (WWW), similar networks, and any combinations thereof.

The user device 120 may be, but is not limited to, a personal computer, a laptop, a tablet computer, a smartphone, a wearable computing device, or any other device capable of receiving and executing code in order to configure the user device to display webpages via a graphical user interface (not shown). The user device is equipped with one or more input/output (I/O) devices (not depicted in FIG. 1) which can display or otherwise project webpage content. To this end, the user device 120 may have installed thereon a web browser (not shown) or other software for viewing or otherwise navigating to webpages.

As depicted in FIG. 1, the user device 120 includes a wallet 125. In this implementation, the wallet 125 may be a program stored and executed on the user device 120. In other implementations, the wallet 125 may be a device (not depicted in FIG. 1) connected to the user device 120. In yet other embodiments, the wallet 125 may be stored on another system (not depicted in FIG. 1) such as a server of a UAT platform or another server owned by a provider of UAT services. The wallet 125 stores ownership data used to access the media content of webpages represented in the database 145 such as, but not limited to, token ownership data, authentication credentials, and the like.

The UAT provider 130 is configured to at least encode webpages and create databases (e.g., a database 145) including nodes and webpage code as described herein. The UAT provider 130 may be further configured to provide media content associated with webpages to owners of UAT nodes in the database 145 as described herein.

The data storage 140 stores a database 145 that is at least partially populated with code and nodes created by the UAT provider 130 as described herein. The database 145 stores nodes (not depicted in FIG. 1) connected to each other (e.g., via edges). The nodes at least include webpage nodes associated with respective webpages and UAT nodes associated with UATs defined with respect to content of the webpages. The webpages in the graphs include portions of code for displaying content of the webpages (e.g., media content of the UATs or otherwise representing the UATs). In an embodiment, the database 145 may be realized as a graph (e.g., a hypergraph such as a multi-tenant temporal hypergraph). An example illustration of nodes in the database 145 realized as a graph is described further below with respect to FIG. 2.

The web content sources 150 store content of webpages including, but not limited to, media content. Such content is encoded by the UAT provider 130 as described herein and stored in the database 145 in order to enable providing the appropriate content when an owner of a UAT (e.g., a user of the user device 120) requests to access the content associated with the UATs they own.

The blockchain network 160 includes multiple computing nodes (not shown), each computing node storing a copy of a blockchain 165. In various embodiments, the database 145 or a copy of the database 145 may be stored on the blockchain 165, thereby enabling the benefits of such blockchain use discussed above. To this end, in some embodiments, the UAT provider 130 may be configured to upload transactions to the blockchain 165 as the database 145 is updated. The transactions uploaded to the blockchain 165 may include a full copy of the database 145 or one or more changes to the existing copy of the database 145.

It should be noted that the network diagram 100 is merely an example, and that other combinations of networked components may be equally utilized without departing from the scope of the disclosure. Further, it should be noted that all components illustrated in FIG. 1 are depicted as communicating via a single network 110 merely for simplicity, but that different networks or no networks may be used for different communications among the components without departing from the scope of the disclosure.

Figure 2A:
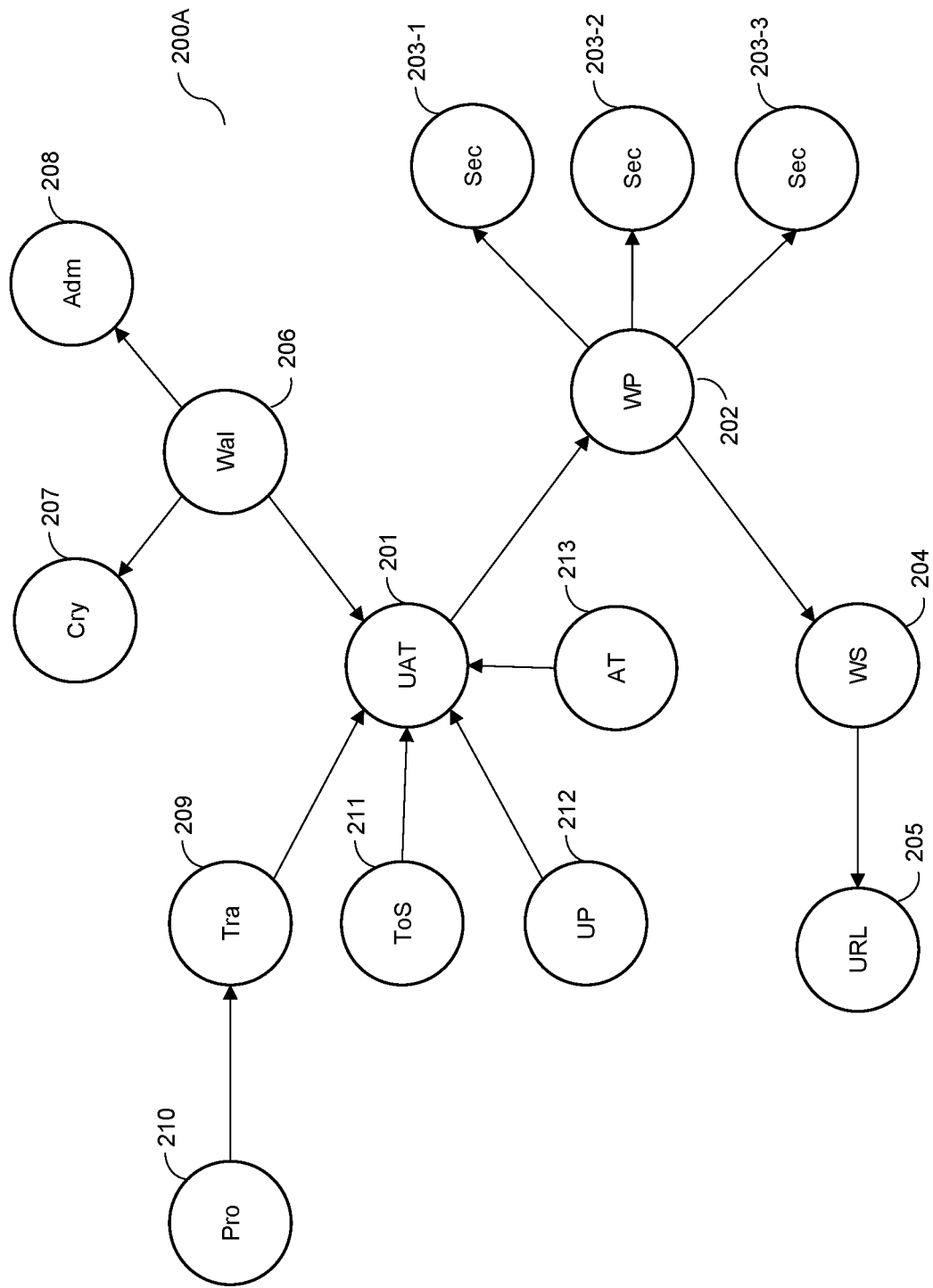
FIG. 2A is a visual depiction of nodes in a database realized as a hypergraph.

FIG. 2A is a non-limiting example visual depiction 200A of nodes in a database realized as a hypergraph.

The example visual depiction 200A includes various nodes connected to a UAT node 201. The UAT node 201 represents a tokenized version of a unique asset (not shown) such as, but not limited to, an NFT or PDT. The unique asset may be a digital or physical asset that is media content included in a webpage or is otherwise represented by media content included in the webpage such that the webpage can be encoded into portions of code (e.g., code in hypertext markup language) for projecting the media content.

In accordance with various disclosed embodiments, the UAT node 201 further includes transaction data indicating historical transactions involving the UAT represented by the UAT node 201 (e.g., transactions which resulted in modification of the database involving changing connections between the UAT node 201 and wallet nodes or owning entity nodes), the initial creation of the UAT node 201, both, and the like. Consequently, the UAT node 201 may also include a complete history of ownership of the UAT. Storing such historical data allows the UAT node 201 to serve as a proof of authenticity or otherwise as a proof of ownership history for the UAT represented by the UAT node 201.

Alternatively, such historical data and any other data related to authenticity may be stored in an authenticity token (AT) node 213 connected to the UAT node 201. The authenticity token node 213 may include, but is not limited to, historical transactions involving the UAT represented by the UAT node 201, an originator of the UAT represented by the UAT node 201 (e.g., a platform or entity which issued or otherwise minted the UAT), both, and the like. In some implementations, the authenticity token node 213 may be accessed when authenticity data is needed to populate an authenticity webpage or authenticity display area. To this end, the portions of code for the webpage may include code that causes retrieval of the authenticity data from the authenticity token node when executed.

The UAT node 201 is connected to a webpage (WP) node 202 representing a corresponding webpage tokenized via the hypergraph. In various embodiments, the UAT node 201 includes one or more portions of code created by encoding the corresponding webpage represented by the webpage node 202 connected to the UAT node 201. Such portions of code may include instructions in formats such as, but not limited to, cascading style sheets (CSS), Javascript, hypertext markup language (HTML), combinations thereof, and the like. In other embodiments (not shown), such portions of code may be stored in code nodes (not shown) which are distinct from the UAT node 201 and are connected to the UAT node 201, the webpage node 202, or both. Such portions of code can be provided to an authorized device, thereby allowing such an authorized device to use the portions of code to generate a view of the webpage including any applicable media content.

In some embodiments, the webpage node 202 may further be connected to multiple section nodes such as section (Sec) nodes 203-1 through 203-3. The section nodes 203-1 through 203-3 represent different sections of the webpage represented by the connected webpage node 202. By representing sections of webpages as distinct nodes, webpage tokenization may be realized in a more granular fashion, i.e., such that multiple tokens may be created for a single webpage and multiple owning entities may each effectively own a different portion of the same webpage. The portion of a webpage for a respective owning entity may be represented and rendered as a distinct webpage including the corresponding content owned by that entity.

The webpage node 202 may further be connected to a website (WS) node 204 representing the website including the webpage represented by the webpage node 202. The website node 204 may further be connected to other webpage nodes (not shown) representing various webpages of the website. Additionally, the website node 204 may be connected to a location node such as a uniform resource locator (URL) node 205 representing a URL associated with the webpage. In other embodiments (not shown), each webpage node may also be connected to a corresponding URL node indicating the location of the respective webpage on the Internet.

The UAT node 201 may further be connected to a node associated with an entity that owns the UAT of the UAT node 201 such as the wallet (Wal) node 206. The wallet node 206 represents and stores data indicating ownership of the UAT represented by the UAT node 201 such that the connection between the wallet node 206 and the UAT node 201 can be utilized to confirm ownership of the UAT by the owner of the wallet. The wallet node 206 may also optionally represent a wallet (e.g., the wallet 125, FIG. 1).

The wallet node 206, in turn, may be connected to one or more cryptocurrency (Cry) nodes 207, a wallet administrator (Adm) node 208, or both. The cryptocurrency nodes 207 may represent cryptocurrency owned by the owner of the wallet. Such cryptocurrency may be used to conduct transactions involving transfers of UATs such as using the cryptocurrency to purchase a UAT to be transferred to the wallet or receiving cryptocurrency as payment for such a UAT. The wallet administrator node 208 may be associated with an administrator of the wallet (e.g., the owner of the wallet or a third party entity who has been granted the right to act on behalf of the wallet owner), and may store data indicating policies related to use of the wallet.

In some implementations (not shown), multiple wallet administrator nodes may be connected to any given wallet node, and each administrator represented by one of the wallet administrator nodes may own a fractional share of the wallet. Each wallet administrator node may further include data indicating a percentage of ownership of the wallet by the administrator associated with the wallet administrator node. This percentage of ownership may further be connected to an accounting system (not shown), which may represent balances in any currency.

The UAT node 201 may further be connected to one or more nodes representing policies to be applied in relation to creation, use, or access of UAT nodes such as, but not limited to, a transfer node 209, a terms of service (ToS) node 211, a usage policy (UP) node 212, or a combination thereof.

The transfer node 209 may act as a minting contract, i.e., a smart contract defining policies for creation of UAT nodes for webpages (i.e., minting of webpages as UATs). To this end, the transfer node 209 may store code that, when executed, applies the rules of the policy to the creation of UAT nodes such as the UAT node 201. Such policies may include, but are not limited to, restrictions on the number of UATs which can be created (i.e., the number of UAT nodes which can be created) for a given webpage or portion thereof. As a non-limiting example, such a policy may limit the creation of UATs for a given webpage to 100 UATs total.

In some implementations, the transfer node 209 may further be connected to a provider (Pro) node 210 representing a provider of the UAT. Such a provider may be, but is not limited to, a creator of the UAT, a company representing the creator of the UAT, and the like. In this regard, the provider node 210 may serve as evidence of the originator of the UAT node 201.

The terms of service node 211 includes code that, when executed, applies the rules of one or more policies defining terms of service for a UAT. Such policies may require, for example, that a user to whom the UAT is transferred (e.g., a user of a wallet represented by a wallet node to which the UAT node will be connected) agree to terms of service before being granted ownership of or access to the UAT.

The usage policy node 212 includes code that, when executed, applies the rules of one or more policies defining restrictions on use of a UAT, access to the UAT, both, and the like. Such restrictions may include, but are not limited to, requiring that UATs not be shared for free, limiting the number of uses of a given UAT, and the like. In various embodiments, multiple usage policies (which may be represented by multiple usage policy nodes, not shown), may be applied to any given UAT or series of UATs. The usage policies may be defined by a platform for the UATs, a marketplace for the UATs, a provider of a UAT, or a combination thereof, depending on the implementation.

In a further embodiment, the usage policy represented by the usage policy node 212 may require an access code before using or accessing the UAT of the connected UAT node 201 in order to prevent unauthorized access. To this end, the UAT node 201 may also be connected to an access code node (not shown) representing an access code required to use or access the UAT. As a non-limiting example, before web content of the webpage represented by the webpage node 202 is provided, a user of the wallet represented by the wallet node 206 or other user indicated by the wallet node 206 may be required to enter the access code indicated by the access code node.

Figure 2B:
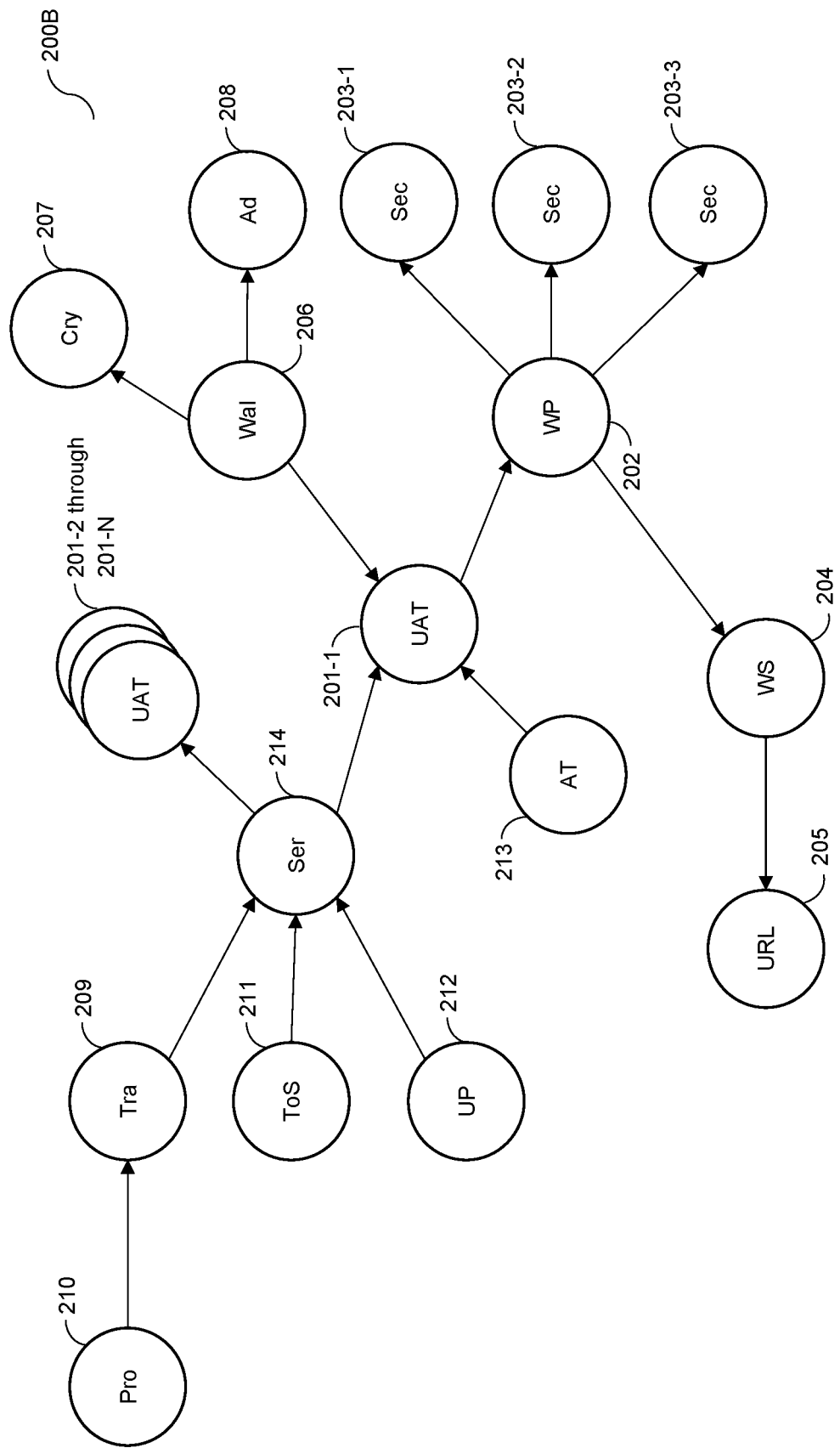
FIG. 2B is a visual depiction of nodes in a database including a token series node.

FIG. 2B is a non-limiting example visual depiction 200B of nodes in a database including a token series node. As depicted in FIG. 2B, the nodes of the database further include a UAT series (Ser) node 214. The UAT series node 214 may define a series of related UATs such as, but not limited to, music tracks of an album, art pieces in a collection, and the like.

The UAT series node 214 is connected to multiple UAT nodes including the UAT node 201-1 and other UAT nodes 201-2 through 201-N. As depicted in FIG. 2B, the series node 214 may be connected to any of the transfer node 209, the terms of service node 211, and the usage policy node 212, such that rules and policies defined in data of those nodes may be applied to all of the UATs represented by the UAT nodes 201-1 through 201-N. Accordingly, using series nodes such as the UAT series node 214 allows for defining policies for groupings of UATs rather than defining policies individually per UAT. As new UATs are added to a series (for example, by connecting new UAT nodes to the UAT series node 214), the policies for the UAT series node 214 may be automatically linked to their respective UAT nodes via the connections in the database.

Further, in another implementation (not depicted in FIG. 2B), additional policy-related nodes (e.g., additional transfer nodes, terms of service nodes, and/or usage policy nodes) may be connected to any or all of the UAT nodes 201-1 through 201-N such that, in addition to any policies applicable to all UATs in the series, each UAT may have its own policies applied.

It should be noted that FIGS. 2A and 2B depict various specific numbers of nodes, numbers of connections, types of nodes, and connections between different types of nodes for example purposes, but that the disclosed embodiments are not necessarily limited to the specific depiction of nodes and connections illustrated in FIG. 2. In particular, only one instance of many types of nodes are depicted in FIGS. 2A and 2B for simplicity purposes, but in various implementations multiple of each node may be included without departing from the scope of the disclosure. Further, the additional UAT nodes 201-2 through 201-N are depicted without connections to nodes other than the series node 214 merely for simplicity, and that, in various implementations, each of these UATs 201-2 through 201-N may be connected to other nodes.

Figure 3:
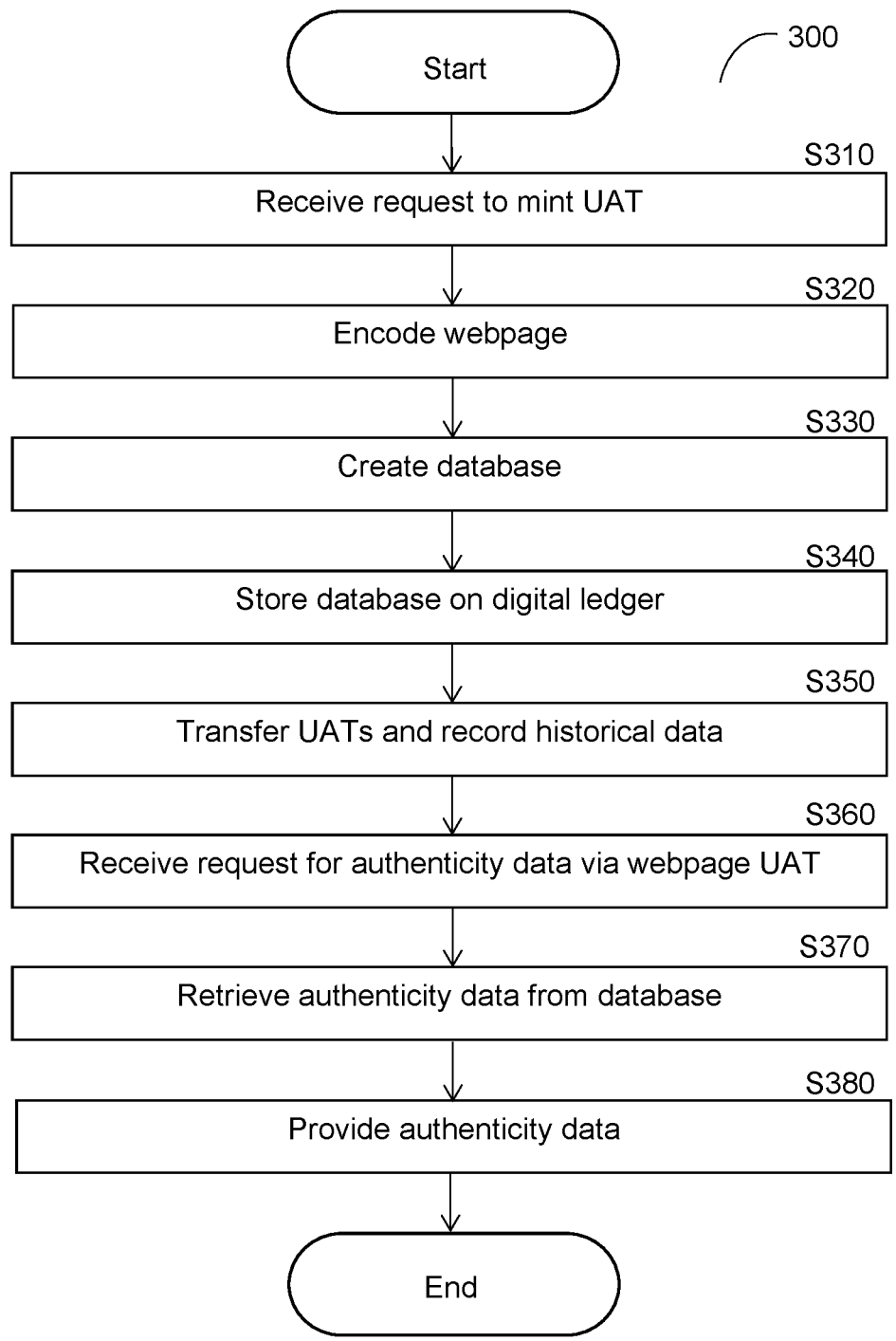
FIG. 3 is a flowchart illustrating a method for delivering authenticity graphical user interface display areas via webpage UATs according to an embodiment.

FIG. 3 is a flowchart illustrating a method for delivering authenticity graphical user interface display areas via webpage unique asset tokens (UATs) according to an embodiment. In an embodiment, the method is performed by the UAT provider 130.

At S310, a request to mint a webpage as a UAT is received. The request may include, but is not limited to, information needed to access the website (e.g., a uniform resource locator, authentication credentials, etc.). The request may further include various restrictions to be applied to the UATs representing the webpage. Such restrictions may include, but are not limited to, terms of service, usage policies, access codes, combinations thereof, and the like. The minting process at least includes encoding all or a portion of the webpage as well as adding tokens for the webpage to a database as described further below.

The webpage is associated with one or more physical or digital assets and includes media content representing the associated assets. As a non-limiting example where the asset is a digital music track, the webpage associated with the asset may include music content of the digital music track, and may further include supplementary content such as text including lyrics to a song, album cover art, text including band biography information, and the like. As a non-limiting example where the asset is a physical comic book, the webpage associated with the asset may include scanned images showing pages and/or the cover of the comic book, and may further include supplementary content such as an author's or artist's signature.

At S320, the webpage is encoded into one or more portions of code. The portions of code include instructions that, when executed by a system (for example, at the user device 120, FIG. 1), causes the system to project media content (e.g., by rendering images or other visual content, projecting sound for audio content, combinations thereof, and the like). Accordingly, such code can be stored in a database (specifically, in nodes of the database) such that the appropriate code can be provided (e.g., to a user device) when the owner of the UAT representing the respective portion(s) of code requests to access the content, and execution of the code on a device of that owner allows for displaying or otherwise projecting the media content to that owner.

In an embodiment, S320 includes creating or identifying the webpage for the UAT. The webpage may be an existing webpage, or may be created based on media content provided by a web content provider. The webpage may therefore be identified based on identification details in the request received at S310 or created based on media content provided via the request.

In accordance with various disclosed embodiments, the portions of code for the encoded webpage include code for causing display of authenticity information in a display area of a device which navigated to the webpage (e.g., a device used by the owner of the UAT). To this end, the portions of code may include code for rendering a display area (e.g., a GUI display area such as a window) or code for otherwise displaying interactable elements which can prompt the device to navigate to a webpage having the display area (e.g., code for displaying an icon which, when interacted with, activates a link to a location of an authentication webpage). The portions of code may further include code for retrieving the relevant authenticity data for the UAT from a database created as described below. More specifically, such code may include instructions for accessing and parsing nodes representing or associated with the UAT which may contain such authenticity data for the UAT such as, but not limited to, UAT nodes, authenticity token nodes, series nodes, transfer nodes, terms of service nodes, usage policy nodes, combinations thereof, and the like.

In some implementations, the portions of code for the encoded webpage may include code for displaying a machine-readable optical label (e.g., a barcode such as a quick response [QR] code) or otherwise for projecting computer-readable media content. The computer-readable media content may contain information for projecting the display area or otherwise for navigating to a webpage adapted to project content demonstrating the authenticity information. The computer-readable media content may be displayed in a portion of the webpage displayed on a device, and may be displayed automatically when the user is viewing the webpage or may be displayed when the user interacts with the interactable element (i.e., signaling that the user wishes for the computer-readable media content to be displayed).

This projection of computer-readable media content may allow other users to view the authenticity data on their own devices. As a non-limiting example, a user who owns a UAT may click on an authenticity token icon, thereby causing display of a display area showing a QR code on a first smartphone. Another person may scan the QR code using a second smartphone, thereby allowing them to view the authenticity display area on the second smartphone.

At S330, a database is created based on the encoded webpage. Creating the database may include creating a new database or adding to an existing database.

The created database includes nodes, and the portions of code of the encoded webpage are distributed among at least some of the nodes of the database. In an embodiment, the database at least includes webpage nodes and UAT nodes. Each webpage node is associated with a respective webpage and indicates at least a portion of the respective webpage that is represented by the node. Each UAT node represents a UAT indicating ownership of a webpage or portion thereof. Each UAT node is at least connected to one or more webpage nodes. In a further embodiment, the portions of code are distributed among the webpage nodes.

The UAT nodes represent tokens which indicate ownership of one or more non-interchangeable assets with respect to a webpage. Such assets may include, but are not limited to, books, albums, tracks, videos, movies, tickets (e.g., concert tickets), graphic novels, trading cards, representations thereof, combinations thereof, portions thereof, and the like. The unique assets represented by UATs in the database include media content of webpages which represents underlying digital or physical assets. The UAT nodes may further represent ownership of the underlying digital or physical assets.

The UATs include tokens representing non-interchangeable items such as, but not limited to, non-fungible tokens (NFTs), provenance and documentation tokens (PDTs), and the like. An NFT is a non-interchangeable token representing a digital item (i.e., a data item). A PDT is a non-interchangeable token representing a physical item. These tokens are non-interchangeable at least in that any given NFT or PDT is not necessarily equivalent to any other token of the same type, in other words, at least some NFTs represent different underlying digital items as compared to at least some other NFTs and likewise for PDTs. It should be noted that some UATs may be equivalent to each other without departing from the scope of the disclosed embodiments. As a non-limiting example, some UATs may be NFTs representing music tracks where some of those NFTs may represent the same music track and others may represent different music tracks, or each NFT may represent a distinct music track.

In some embodiments, multiple UAT nodes may be connected to a given webpage node, thereby establishing fractional ownership of the webpage, the underlying item represented by the webpage, or both. Such fractional ownership may include equal shares of ownership or may be defined as percentage ownerships that may differ among the multiple owners. In some implementations, when a UAT having multiple owners with fractional ownership (i.e., a UAT represented by an UAT node among multiple UAT nodes connected to a given webpage node) is transferred in exchange for a different item or currency, ownership of the item or currency may be distributed among the fractional owners according to their respective shares or percentage ownership.

The nodes of the database may further include other types of nodes such as, but not limited to, wallet nodes, website nodes, location identifier nodes (e.g., uniform resource locator or URL nodes), section nodes, transfer nodes, terms of service nodes, usage policy nodes, content nodes, combinations thereof, and the like. Various examples of different types of nodes are described with respect to FIGS. 2A-B as discussed above.

Figure 4:
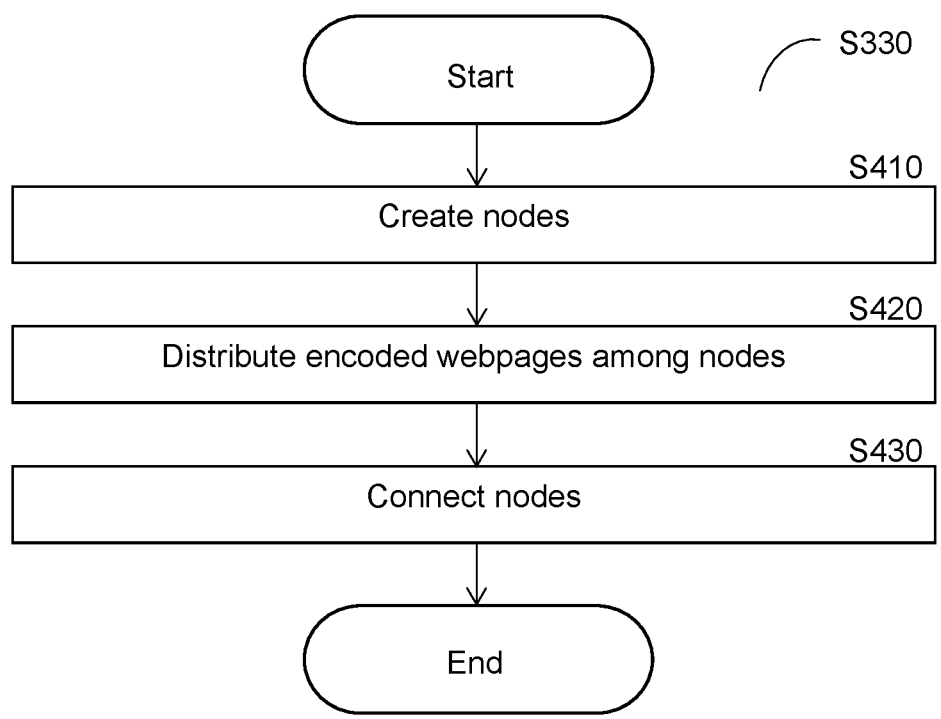
FIG. 4 is a flowchart illustrating a method for creating a UAT database according to an embodiment.

In an embodiment, the database may be created as discussed with respect to FIG. 4. FIG. 4 is a flowchart S330 illustrating a method for creating a UAT database according to an embodiment.

At S410, nodes of the database are created. In an embodiment, the nodes in the database at least include webpage nodes representing encoded webpages or portions thereof as well as UAT nodes representing UATs indicating ownership of respective webpages or portions thereof. In a further embodiment, the nodes of the database include nodes associated with entities who own the UATs such as wallet nodes representing wallets owned by such entities or owning entity nodes representing the entities themselves. In yet a further embodiment, the nodes of the database may further include any of the other nodes described above with respect to FIGS. 2A and 2B. It should be noted that the database may include other nodes without departing from the scope of the disclosure.

In accordance with various disclosed embodiments, the nodes of the database may further store historical data of transactions in which UATs are transferred. To this end, in a further embodiment, creating the nodes includes storing initial transaction data in one or more of the nodes. As a non-limiting example, transaction data representing the initial creation of each UAT may be stored in the respective UAT node for each UAT when the UAT nodes are created. Alternatively the initial transaction data may be null data representing that no transactions involving the UAT have occurred yet.

The transaction data stored in the database may be used to demonstrate authenticity of any given UAT represented by one of the UAT nodes in the database. As a non-limiting example, the webpage of a given UAT may include an icon or other interactable artifact representing an authenticity token, which in turn has a corresponding certificate of authenticity webpage or otherwise prompts display of a view showing authenticity information such as a GUI display area. Such a certificate of authentication webpage or other display area may include information such as, but not limited to, transaction history for the UAT, a creator of the UAT, a source UAT platform on which the UAT was sold, serial number, associated series (e.g., a series represented by a series node such as the series node 214, FIG. 2B), usage statistics (e.g., how often the app is used), applicable usage policies, terms of a minting contract, rights contract, terms of service, or any other information that may be relevant to understanding use or ownership of the app as a UAT. This information may be at least partially derived from data stored in the database such as the transaction data.

As noted above, the transaction data stored in the database may be accessed by code of encoded webpages associated with UATs in order to retrieve information related to transaction history, origination, or otherwise related to authenticity of the UATs. The transaction data, when accessed, can be used to populate a display area showing authenticity-related information.

At S420, the portions of code of encoded webpages are distributed among the created nodes. In an embodiment, the portions of code may be distributed into webpage nodes of the respective webpages which were encoded into those portions of code. As a non-limiting example, a first webpage may be encoded into a first portion of code and a second webpage may be encoded into a second portion of code such that the first portion of code is distributed to a first webpage node representing the first webpage and the second portion of code is distributed to a second webpage node representing the second webpage.

At S430, the created nodes are connected. In an embodiment, the created nodes are connected at least such that each UAT node is connected to a respective webpage node representing the webpage provided as a UAT. In a further embodiment, the created nodes may be connected such that each UAT node is also connected to a wallet node or owning entity node associated with the entity who owns the UAT. In another embodiment, the created nodes may be connected such that each UAT node is further connected to nodes for enforcing restrictions on use or access of the respective UAT such as, but not limited to, transaction nodes, terms of service nodes, usage policy nodes, access code nodes, combinations thereof, and the like.

Returning to FIG. 3, at optional S340, the database is stored on a digital ledger. In an embodiment, S350 may include uploading the database to a decentralized digital ledger such as a blockchain. As noted above, storing the database on a blockchain allows for ensuring the accuracy of the data in the database by providing an immutable record against which the database can be compared when making transfers, and storing the database on a decentralized ledger in addition to a centralized ledger allows for portability, i.e., the database may be transferred to a new digital ledger relatively easily. As a non-limiting example, the database may be stored as a side chain on a blockchain.

At optional S350, one or more of the UAT nodes are transferred to a new owner. In an embodiment, S350 may occur when a request to transfer the UAT nodes is received from a current owner of the UAT nodes. The request may indicate to transfer the UAT nodes immediately or upon meeting one or more conditions. The request may be received from a wallet of the current owner.

In an embodiment, transferring the UATs may include reconnecting the respective UAT nodes corresponding to those UATs. An example method for transferring UATs via the database is described further below with respect to FIG. 5. Each transfer may therefore be performed in accordance with FIG. 5.

In accordance with various disclosed embodiments, S350 further includes recording historical data indicating the most recent transaction or transactions as part of the transaction data for the UAT. Such historical data may be recorded, for example, in a UAT node of the UAT in the database.

At S360, a request for authenticity data is received. In an embodiment, the request is received via a webpage UAT and, more specifically, based on user interactions with the webpage UAT (e.g., via interactions through a GUI displayed on a device that navigated to the webpage UAT). In another embodiment, the authenticity information may be displayed as part of the webpage UAT by default such that the request for authenticity information is a request for the webpage UAT itself.

When the request is received via user interactions with a webpage corresponding to a particular UAT, the request may be received in response to a user interacting with an interactable element displayed in the webpage. As a non-limiting example, the request may be received when a user clicks on an "authenticity token" icon representing the desired authenticity information.

To this end, the user may first request the webpage corresponding to the UAT by navigating to a location of the webpage, thereby causing their user device to request content of the webpage. When the portions of code of the webpage are received and executed on the user device, an interactable element representing an authenticity token (e.g., a token of the authenticity information) is displayed. The user may then interact with the interactable element, thereby requesting the authenticity information.

When the request is a request for the webpage UAT itself, the request may be received by a user navigating, via their user device, to a location (e.g., a uniform resource locator) of a webpage corresponding to the UAT they own. When the user navigates to such a location (e.g., via a browser software application installed on the user device), the user device requests the web content of the webpage from a host server, thereby requesting content showing the authenticity information. When the host server provides such web content to the user device and the code included therein is executed on the user device, the user device becomes configured to display the web content including the authenticity information therein.

At S370, the authenticity data is retrieved from the database. In an embodiment, S370 includes retrieving the authenticity data from certain nodes in the database such as, but not limited to, UAT nodes, authenticity token nodes, series nodes, transfer nodes, terms of service nodes, usage policy nodes, combinations thereof, and the like. To this end, it is noted that the request for the authenticity data may specify the UAT node for which authenticity data is requested or may otherwise include identifying details for the UAT for which the authenticity data should be retrieved.

At S380, the authenticity data is provided. The authenticity data may be provided directly for the purpose of populating a display area with the authenticity data, or may be provided in the form of an authenticity webpage populated with the authenticity data.

In some implementations, content of the webpage and, in particular, the code for displaying the authenticity display area, may be stored on the user device for subsequent use. As a non-limiting example, the code may be stored in a cache. Storing the code in a cache or other local storage of the user device allows for accessing the authenticity display area even when the user device is not connected to the Internet. In other implementations, an Internet connection may be required to access the authenticity display area.

Figure 5:
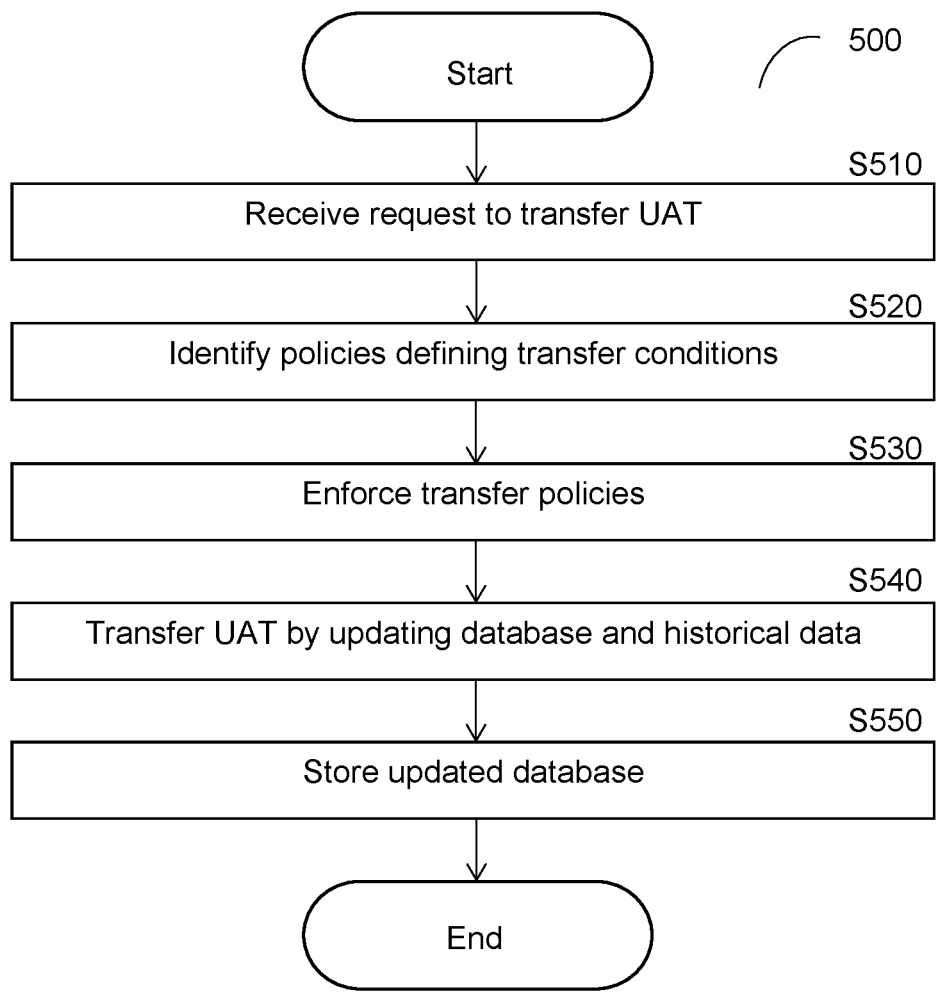
FIG. 5 is a flowchart illustrating a method for transferring UAT nodes of webpages using a database according to an embodiment.

FIG. 5 is an example flowchart 500 illustrating a method for transferring non-fungible token nodes of webpages using a database according to an embodiment. In an embodiment, the method may be performed by the UAT provider 130, FIG. 1.

At S510, a request to transfer a unique asset token (UAT) is received. The request indicates information to be used for determining how to alter a database storing nodes in order to realize the transaction such as, but not limited to, an identifier of the UAT being transferred, an identifier of a first user from whom the UAT is being transferred, an identifier of a second user to whom the UAT is being transferred, identifiers of wallets of such users, identifiers of tokens of any of the foregoing, combinations thereof, and the like.

At optional S520, policies defining any potential transfer conditions on transferring the UAT are identified. Such conditions may be defined in data included in, for example, nodes of the database storing the UAT node representing the UAT. To this end, S520 may include scanning a database including an UAT node representing the UAT to be transferred for any nodes defining policies related to transferring the UAT such as, but not limited to, a transfer node or a terms of service node connected to such an UAT node or to a UAT series node of a UAT series the UAT belongs to. In an example implementation, the policies related to transferring the UAT may include a requirement that the user to which the UAT node is transferred must accept terms of service for the transferred UAT.

At optional S530, the policies defining the applicable transfer conditions identified at S520 are enforced. In the example implementation where the policies require the new owner to accept terms of service, S530 may include presenting the terms of service (e.g., by sending a notification for display on a user device of the new owner) and receiving a response indicating whether the user accepted the terms of service. In some implementations, if requirements of the policies related to transfers are not met, the UAT may not be transferred to the new owner.

At S540, the database is updated in order to transfer the UAT. In an embodiment, S540 includes modifying connections in the database including the UAT node representing the UAT such that the UAT is connected to a different node associated with the owning entity (e.g., a different wallet node or a different owning entity node).

More specifically, the transferred UAT may be initially connected to a node associated with the current owner (e.g., a wallet node associated with a wallet owned by the current owner of the UAT nodes or an owning entity node representing the current owner) and then reconnected to a node associated with the new owner instead. The database including the reconnected nodes is therefore updated.

In a further embodiment, updating the database may further include updating historical data stored in nodes of the database related to transactions. As a non-limiting example, historical data of transactions in which a UAT was transferred may be stored in an UAT node corresponding to the UAT such that updating the database may include adding a new entry to the historical data stored in the UAT node.

At optional S550, the updated database may be stored in a centralized data storage, a decentralized ledger such as a blockchain, or both.

Figure 6:
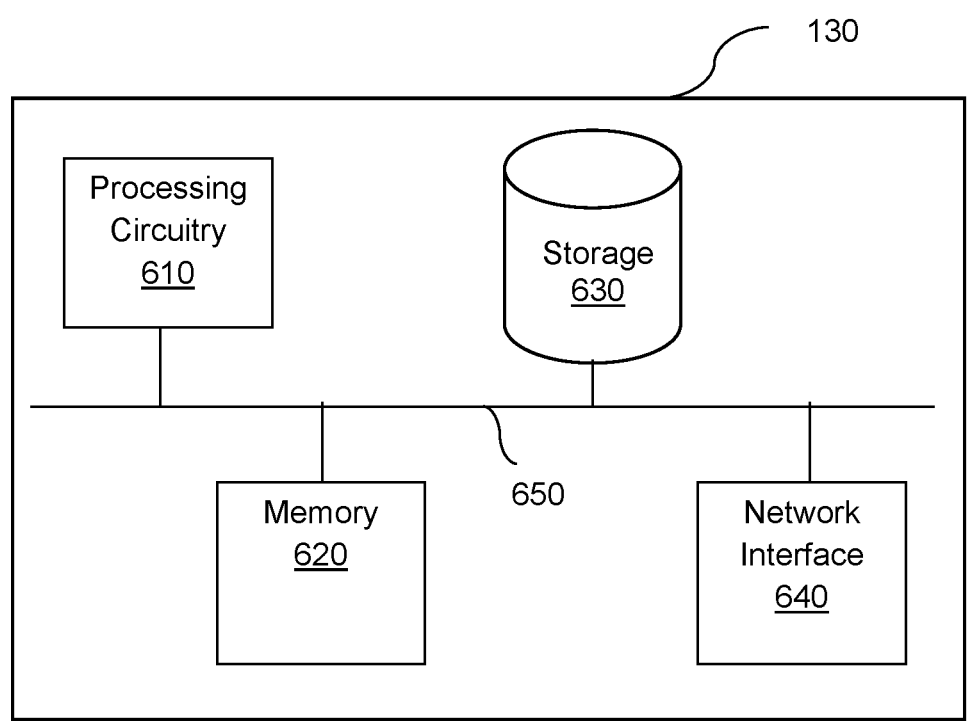
FIG. 6 is a schematic diagram of an UAT provider according to an embodiment.

FIG. 6 is an example schematic diagram of a unique asset token (UAT) provider 130 according to an embodiment. The UAT provider 130 includes a processing circuitry 610 coupled to a memory 620, a storage 630, and a network interface 640. In an embodiment, the components of the UAT provider 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the UAT provider 130 to communicate with, for example, the user device 120, the data storage 140, the web content sources 150, the blockchain network 160, combinations thereof, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing authenticity display areas via webpage unique asset tokens, comprising:
    encoding a webpage corresponding to a unique asset token (UAT) into a plurality of portions of code including at least one first portion of code and at least one second portion of code, wherein the UAT is associated with at least one unique asset, wherein the at least one first portion of code causes projection of media content corresponding to the at least one unique asset when executed, wherein the at least one second portion of code causes projection of a graphical user interface display area populated with authenticity data of the UAT when executed;
    creating a database including a plurality of nodes, the plurality of nodes including a plurality of webpage nodes and a plurality of UAT nodes, wherein the encoded portions of code of the webpage and at least a portion of the authenticity data of the UAT are stored among a portion of the plurality of nodes, wherein a first webpage node of the plurality of webpage nodes is associated with the webpage, wherein a first UAT node of the plurality of UAT nodes is connected to the first webpage node, wherein the first UAT node corresponds to the UAT; and
    providing the at least one portion of code to a device authorized by an owner of the at least one first UAT node.

2. The method of claim 1, wherein the at least one second portion of code includes instructions for retrieving the at least a portion of the authenticity data from the database.

3. The method of claim 1, wherein the at least one first portion of code further causes projection of an interactable element on a device when executed by the device, wherein the at least one second portion of code is executed when a user of the device interacts with the interactable element.

4. The method claim 1, wherein the plurality of nodes of the database further includes an authenticity token node, wherein the authenticity data of the UAT is stored in the authenticity token node.

5. The method of claim 1, wherein the graphical user interface display area includes a machine-readable optical label.

6. The method of claim 5, wherein the machine-readable optical label includes any of: the authenticity data, and a link to an authenticity data webpage populated with the authenticity data.

7. The method of claim 1, wherein the authenticity data of the UAT is stored in the first UAT node.

8. The method of claim 1, wherein the plurality of portions of code are provided to the device when the device navigates to the webpage.

9. The method of claim 1, wherein the authenticity data includes at least one of: a transaction history of transactions involving the UAT, and an originator of the UAT.

10. A non-transitory computer readable medium having stored thereon instructions for causing a processing circuitry to execute a process, the process comprising:
    encoding a webpage corresponding to a unique asset token (UAT) into a plurality of portions of code including at least one first portion of code and at least one second portion of code, wherein the UAT is associated with at least one unique asset, wherein the at least one first portion of code causes projection of media content corresponding to the at least one unique asset when executed, wherein the at least one second portion of code causes projection of a graphical user interface display area populated with authenticity data of the UAT when executed;
    creating a database including a plurality of nodes, the plurality of nodes including a plurality of webpage nodes and a plurality of UAT nodes, wherein the encoded portions of code of the webpage and at least a portion of the authenticity data of the UAT are stored among a portion of the plurality of nodes, wherein a first webpage node of the plurality of webpage nodes is associated with the webpage, wherein a first UAT node of the plurality of UAT nodes is connected to the first webpage node, wherein the first UAT node corresponds to the UAT; and
    providing the at least one portion of code to a device authorized by an owner of the at least one first UAT node.

11. A system for providing authenticity display areas via webpage unique asset tokens, comprising:
    a processing circuitry; and
    a memory, the memory containing instructions that, when executed by the processing circuitry, configure the system to:
    encode a webpage corresponding to a unique asset token (UAT) into a plurality of portions of code including at least one first portion of code and at least one second portion of code, wherein the UAT is associated with at least one unique asset, wherein the at least one first portion of code causes projection of media content corresponding to the at least one unique asset when executed, wherein the at least one second portion of code causes projection of a graphical user interface display area populated with authenticity data of the UAT when executed;
    create a database including a plurality of nodes, the plurality of nodes including a plurality of webpage nodes and a plurality of UAT nodes, wherein the encoded portions of code of the webpage and at least a portion of the authenticity data of the UAT are stored among a portion of the plurality of nodes, wherein a first webpage node of the plurality of webpage nodes is associated with the webpage, wherein a first UAT node of the plurality of UAT nodes is connected to the first webpage node, wherein the first UAT node corresponds to the UAT; and provide the at least one portion of code to a device authorized by an owner of the at least one first UAT node.

12. The system of claim 11, wherein the at least one second portion of code includes instructions for retrieving the at least a portion of the authenticity data from the database.

13. The system of claim 11, wherein the at least one first portion of code further causes projection of an interactable element on a device when executed by the device, wherein the at least one second portion of code is executed when a user of the device interacts with the interactable element.

14. The system claim 11, wherein the plurality of nodes of the database further includes an authenticity token node, wherein the authenticity data of the UAT is stored in the authenticity token node.

15. The system of claim 11, wherein the graphical user interface display area includes a machine-readable optical label.

16. The system of claim 15, wherein the machine-readable optical label includes any of: the authenticity data, and a link to an authenticity data webpage populated with the authenticity data.

17. The system of claim 11, wherein the authenticity data of the UAT is stored in the first UAT node.

18. The system of claim 11, wherein the plurality of portions of code are provided to the device when the device navigates to the webpage.

19. The system of claim 11, wherein the authenticity data includes at least one of: a transaction history of transactions involving the UAT, and an originator of the UAT.

* * * * *